United States Patent [19]
Labarber et al.

[11] 3,828,279
[45] Aug. 6, 1974

[54] DATA HANDLING SYSTEM EMPLOYING TIME MODULATION

[75] Inventors: James P. Labarber, Santa Ana; Ross A. Shade, Newport Beach; William H. Terbrack, Santa Ana, all of Calif.

[73] Assignee: J. D. Wrather, Jr., Beverly Hills, Calif.

[22] Filed: Oct. 13, 1972

[21] Appl. No.: 300,401

Related U.S. Application Data

[63] Continuation of Ser. No. 861,785, Sept. 29, 1969, abandoned.

[52] U.S. Cl. .................. 332/2, 307/269, 324/78 D, 324/83 D, 325/143, 328/63, 332/9 R
[51] Int. Cl. ............................................. H03k 7/06
[58] Field of Search ......... 332/9 R, 9 T, 2; 325/186, 325/143; 328/63; 307/269; 324/77 D, 79 D, 83 D

[56] References Cited
UNITED STATES PATENTS

| | | | |
|---|---|---|---|
| 2,478,919 | 8/1949 | Hansell | 332/9 R X |
| 2,896,073 | 7/1959 | Westphal | 325/186 X |
| 2,957,146 | 10/1960 | Cosby et al. | 332/2 X |
| 2,981,943 | 4/1961 | Dodington | 325/186 X |
| 3,003,123 | 10/1961 | Runyan | 332/2 X |
| 3,350,637 | 10/1967 | Pochtar | 332/9 T X |
| 3,491,299 | 1/1970 | Garber et al. | 332/2 X |

*Primary Examiner*—Alfred L. Brody
*Attorney, Agent, or Firm*—Gausewitz, Carr & Rothenberg

[57] ABSTRACT

Each of a number of substantially conventional transducers is packaged together with a modulator to provide an output having a period that is linearly related to the analog input or condition sensed by the transducer. A multiplexer switch is included in each package and a number of channels of combined transducer modulator and multiplexer switches are arranged to be addressed in a selected order for sequential readout as determined by operation of an address controller. The address controller receives data in sequence from the multiplexer switches of the several time modulators and generates a gate signal having a duration equal to the duration of a number of consecutive chronologically contiguous data periods from each one of the transducer-time modulator channels. The gate signal allows a number of fixed frequency, high repetition rate clock pulses to be passed to a pulse counter and memory circuit which thus provides a digital representation and storage of the analog or condition inputs to the several transducers.

A unique time modulator comprising a modified, free-running multivibrator receiving an input through an impedance conversion circuit from the sensing transducer has each half cycle duration linearly related to such input. A power supply in common with the transducer is employed by the modulator in such a manner that fluctuations of the power supply cause variations in the transducer output that are compensated by concomitant variations of the modulator.

14 Claims, 9 Drawing Figures

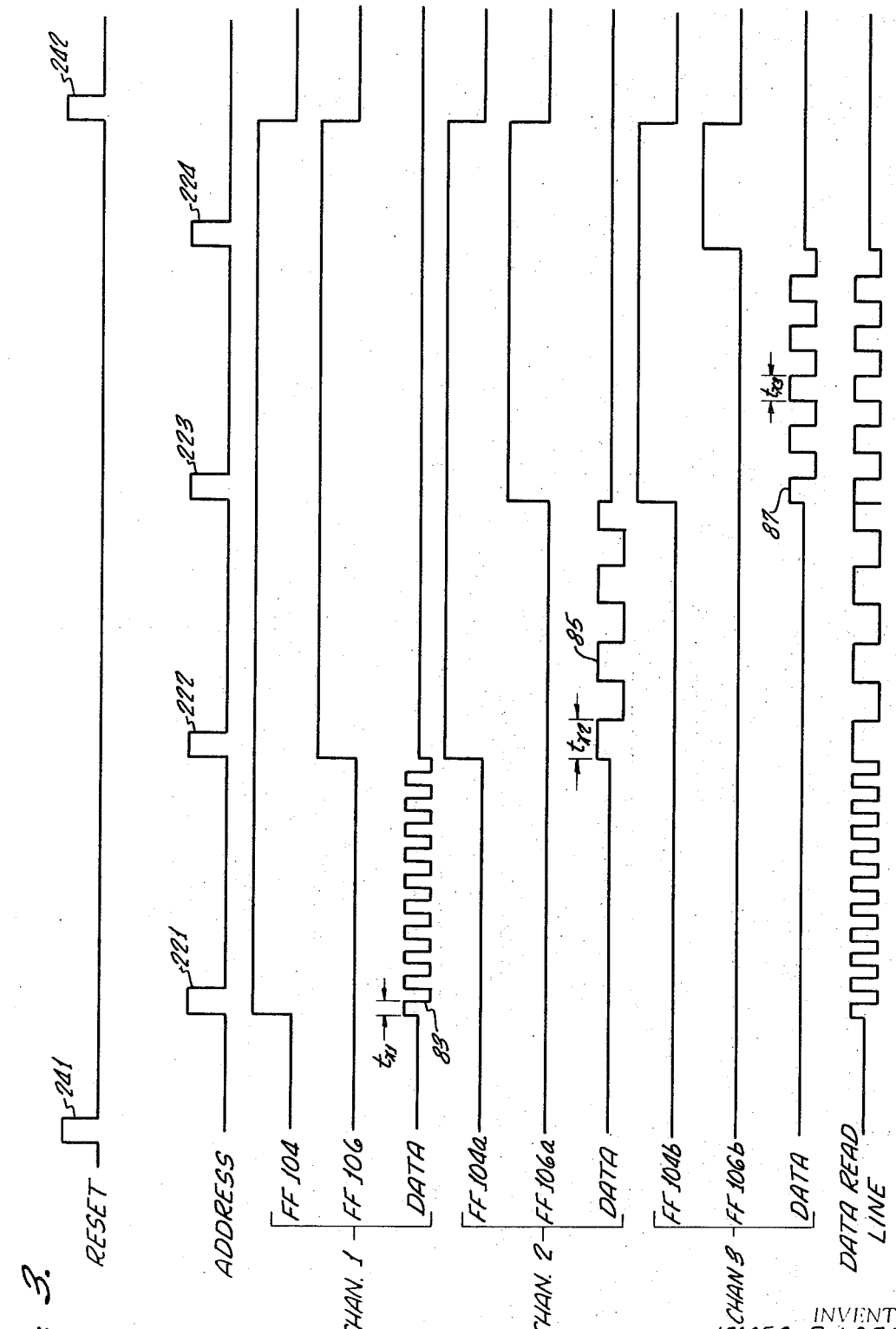

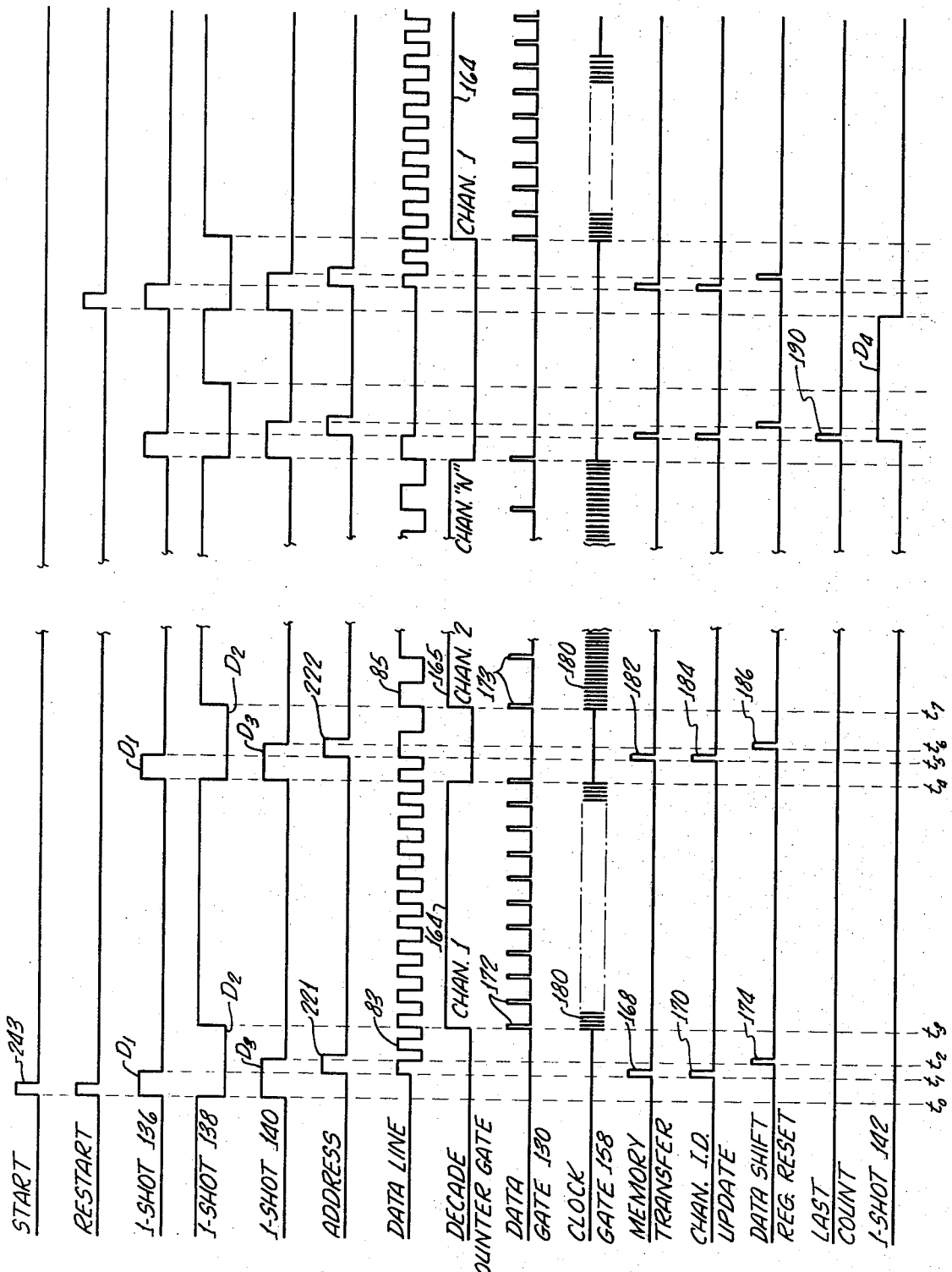

DATA HANDLING SYSTEM EMPLOYING TIME MODULATION

This is a continuation of U.S. Pat. application Ser. No. 861,785, filed Sept. 29, 1969, now abandoned.

BACKGROUND OF THE INVENTION

1. Field of Invention

This invention relates to data handling systems, and more particularly, concerns apparatus and methods for modulating and multiplexing a number of analog signals such as are obtained from a plurality of condition sensing transducers.

2. Description of Prior Art

The collection, handling, and transmission of data and various types of information is a fundamental problem that has been subject to extensive and intensive study, design, and development for many years. In general, data is collected by a transducer, modulated upon a carrier and transmitted by wire or radio to a distant location where it is demodulated and used as required.

Signal level fluctuations and other noise in long and short transmission lines and circuitry have dictated systems that avoid the use of amplitude variations. Thus, transmission of varying amplitude analog signals and pulse amplitude modulation systems are not widely used for high accuracy data handling and transmission systems.

Pulse width modulation systems employ a fixed frequency, fixed repetition rate signal having a duty cycle that is modulated in accordance with the information to be transferred. In such a system, the time duration of one portion of a fixed time interval cycle will itself vary in accordance with the information to be transmitted. Nevertheless, there will exist a significant amount of dead time which varies with the magnitude of the signal to be transmitted and which is required by the inherent fixed repetition rate of pulse width modulation techniques.

Pulse code modulation systems have been employed, such as that shown for example in the U.S. Pat. to Martin L. Klein et al. No. 3,293,608 for High Speed Data Conversion and Handling, wherein a plurality of analog signals are fed through a multiplexer, then clamped and digitized in a straight binary code while so clamped. Such systems which multiplex the analog signal require additional precision circuitry between a transducer, for example, that generates the information to be transmitted, and the multiplexer itself. Thus, a transducer with its own power supply is required. Generally, there is also required an amplifier having its own power supply, and in addition, signal conditioning circuitry, again having its own power supply. All of these are required between the transducer and the multiplexer input. Since analog signals are being handled prior to the multiplexer input, it will be readily appreciated that precision of each of these circuits, including the precision of their power supplies, is of primay significance if precision of the final result is desired.

In the commonly used frequency multiplexing system, a carrier signal is generated for transmission, and a plurality of subcarrier oscillators each having a different frequency modulated by the information to be transmitted are superimposed upon the carrier. Information that can be transmitted by a frequency multiplexing system is severely restricted by band width limitations of the circuitry and transmission lines. In such systems if increased speed and increased precision are desired, still higher frequencies are required thus imposing still greater limitations on the circuitry and apparatus employed.

A number of different types of transducers have been suggested which provide a digitized output in one form or another, either by electrical, optical, mechanical, or other arrangements. Thus, for example, U.S. Pat. No. 3,087,148 to F. A. Ludewig, Jr. describes a digital transducer that employs a stress sensitive optical material. This arrangement is, of course, specifically limited to the configuration, mechanical, electrical, and optical of the specific transducer.

U.S. Pat. No. 3,247,711 to G. N. Howatt describes a digital force measuring apparatus employing a capillary tube that provides a pattern of analog signals which vary progressively in amplitude along the tube length.

U.S. Pat. No. 3,111,847 to R. R. Kooiman, et al., describes a motor-driven centrifugal force balancing system wherein the velocity of the motor shaft is proportional to pressure.

U.S. Pat. No. 3,399,572 to Riordan, et al., teaches a vibrating beam pressure transducer with capacitive sensing elements in an oscillator circuit having a frequency proportional output. Like Ludewig, Jr., it will be seen that Howatt, Kooiman, and Riordan all require rather complex and special types of transducing arrangements.

Another attempt in the prior art to provide a frequency proportional output, employing a special type of transducer, is described in U.S. Pat. No. 3,247,718 to A. Anthony D'Onofrio. In the D'Onofrio patent, a tunnel diode, in switching between voltage states, interrupts the charge or discharge cycle of a capacitor, and hence, sets the frequency of oscillation of a relaxation oscillator in accordance with the value of peak and valley currents of the tunnel diode. This diode when subjected to external pressure experiences a change in the values of peak and valley currents whereby the frequency of oscillation of the oscillator circuit depends on the pressure to which the tunnel diode is subjected. According to the patentee, there is a very precise linear relation between pressure experienced by the tunnel diode and the frequency of the modulated oscillator. This arrangement, of course, requires a special type of transducer and further requires a specific type of condition input, namely pressure. Even so the output of this arrangement is a signal having a frequency proportional to the information. It does not have a linearity in the time domain as does the device of the invention described herein.

SUMMARY OF THE INVENTION

The present invention, in accordance with a preferred embodiment thereof, operates upon a condition signal generated by a conventional transducer to generate a repetitively fluctuating modulated signal that has a period having a predetermined relation to the condition that is being sensed. The signal comprises a series of chronologically contiguous discrete time frames. More specifically, the modulated signal has a period, that is, a time interval between repetitions thereof, that is substantially linear with respect to the information (the condition being sensed by a transducer) to be handled and transmitted. Thus the system is substantially independent of voltage or signal level variations.

In a multichannel system, there is generated for each of the analog signals to be transmitted, a set of repetitive fluctuating or discrete signals each having a period or time frame indicative of the respective analog information to be transmitted. Each signal, for example, may be a data pulse having a width directly proportional to the analog information. A number of signals from each set of signals is selected and the total duration of such number of signals is used to provide a representation of the respective analog information signals. Since each signal of the set itself is representative of the corresponding analog value, the summation or total duration of a number of such signals provides a convenient arrangement for averaging the information that is afforded by the time modulation. In order to complete the digitization of the time modulated signals, a train of fixed repetition rate clock pulses is gated for sequential gating periods. Each such gating period has a duration equal to the total duration of the selected number of signals from the set. Thus, for example, where each signal of a set comprises a data pulse having a duration substantially linearly related to the analog input and a set comprises ten consecutive data pulses, the fixed repetition rate clock pulses would be gated for the duration of ten of such data pulses passed through the channel representing one of the analog signals. The clock pulses are then gated (to handle the next channel of information) for a total time equal to the total duration of, say, ten data pulses from the next channel handling another analog signal. In this manner, making the fixed repetition rate clock pulse gate equal in time to an integral multiple of the data pulse duration, a large sampling of the time modulated signal may be obtained. Although a smaller time slice may be employed, it will still contain the same precision information since the time of the modulated signal is at all points linear with respect to the information being transmitted.

Where sampling by the multiplexer occurs for a period of time that is directly related to the amplitude of the information being handled, the multiplexer need not step from one channel to the next at a fixed rate but can and is arranged to most efficiently switch to a succeeding channel immediately upon termination of the varying sample time of the preceding channel.

BRIEF DESCRIPTION OF THE DRAWINGS

FIG. 7 is a synchrograph showing additional wave forms and timing, particularly in connection with the details of FIG. 6.

DESCRIPTION OF PREFERRED EMBODIMENT

Figure 1:
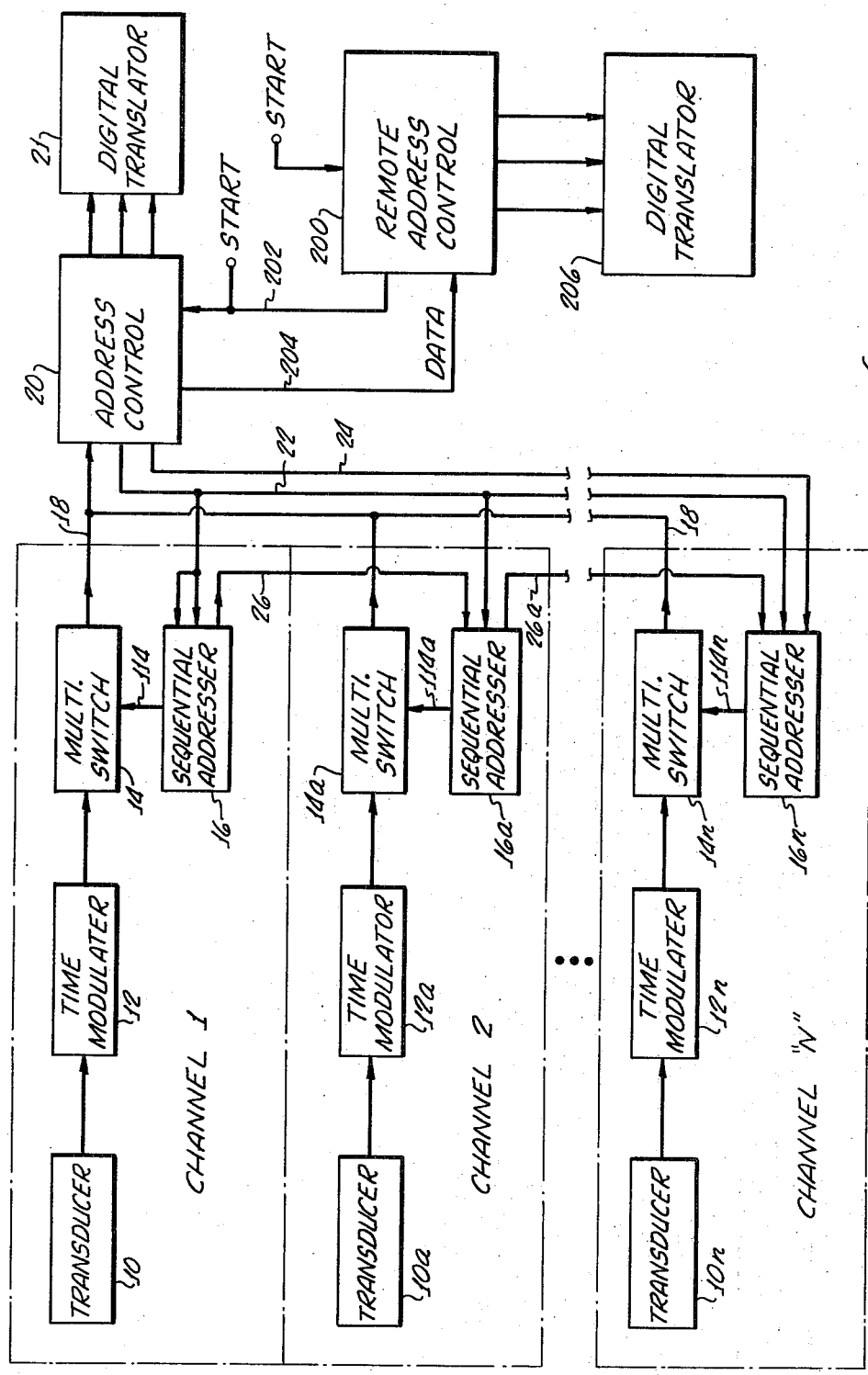
FIG. 1 comprises a block diagram of a preferred embodiment of this invention.

As illustrated in FIG. 1, the first of a plurality of channels of information transducing, handling, and modulating circuitry comprises a substantially conventional transducer 10 that is adapted to respond to a condition to be sensed and provide an analog signal output to a time modulator 12 that in turn feeds through a multiplexing switch 14 under control of a sequential addresser 16 to provide a time modulated data signal on an output data line 18.

Second and additional channels of the information handling system include substantially identical arrangements of transducers 10a, 10n feeding to time modulators 12a, 12n, and thence through multiplexer switches 14a and 14n under control of the indivdual channel sequential addressers 16a and 16n. Thus the output data line 18 will receive in sequence from the several channels each of the time modulated signals having periods directly proportional to the transducer input as will be more particularly described hereinafter.

The data signal on line 18 is sent to an address control 20 that feeds, via lines 22 and 24, address and reset pulses to the sequential addressers of each channel. The address control 20 together with the multiplexer switches and sequential addresser of the several channels collectively comprise a multiplexing arrangement which employs the reset pulse on line 24 to zero or initiate recycling of the multiplexer cycle and which employs the address pulse on line 22 to cause the multiplexer to switch from one channel to the next.

The address pulse is fed to sequential addresser 16 of channel one which then closes the multiplexer switch 14, that is, causes this switch to pass a data signal to output data line 18, (all other multiplexer switches having been opened by a previously established reset pulse on line 24). Address pulses on line 22 are generated at intervals dependent upon the periods of the data pulse signals provided by line 18 to the address control. The latter in effect counts data pulses from one channel, and at the end of the count of a selected number such as ten such data pulses, a second address pulse is sent out to cause the multiplexer to switch from channel one to channel two. Upon occurrence of such second address pulse, which is fed by a common line 22 to all sequential addressers, the sequential addresser 16 of the first channel opens its multiplexer switch 14 and at the same time sends out on line 26 a transfer out signal which is fed to the next sequential addresser 16a together with the address pulse on line 22. Receiving a pulse on both lines 22 and 26, addresser 16a causes the second channel multiplexer switch 14 to close and modulated data pulses from this channel are transferred to the data output line 18. Address control 20 counts these pulses, and having counted a predetermined number of such data pulses, the address control proceeds to send out the next address pulse which is received by the channel next in line together with an output on the transfer out line 26a from sequential addresser 16a. This sequence continues until the several channel multiplexer switches have been activated one at a time and the last channel, or channel n as illustrated in FIG. 1, has been addressed and has supplied its data. At this time the address control determines that one full system cycle has been completed and a new reset pulse is sent out to all addressers of all channels via line 24 to open all multiplexer switches and the apparatus then begins a new cycle.

Details of the address control and multiplexer cycling and recycling will be described below in connection with FIG. 6 and the synchrograph of FIG. 7. However, at this point, in order to facilitate description and understanding of the operation of the system, an exemplary channel will be described with reference to FIGS. 2, 3, 4 and 5.

TIME MODULATED TRANSDUCER

Figure 2:
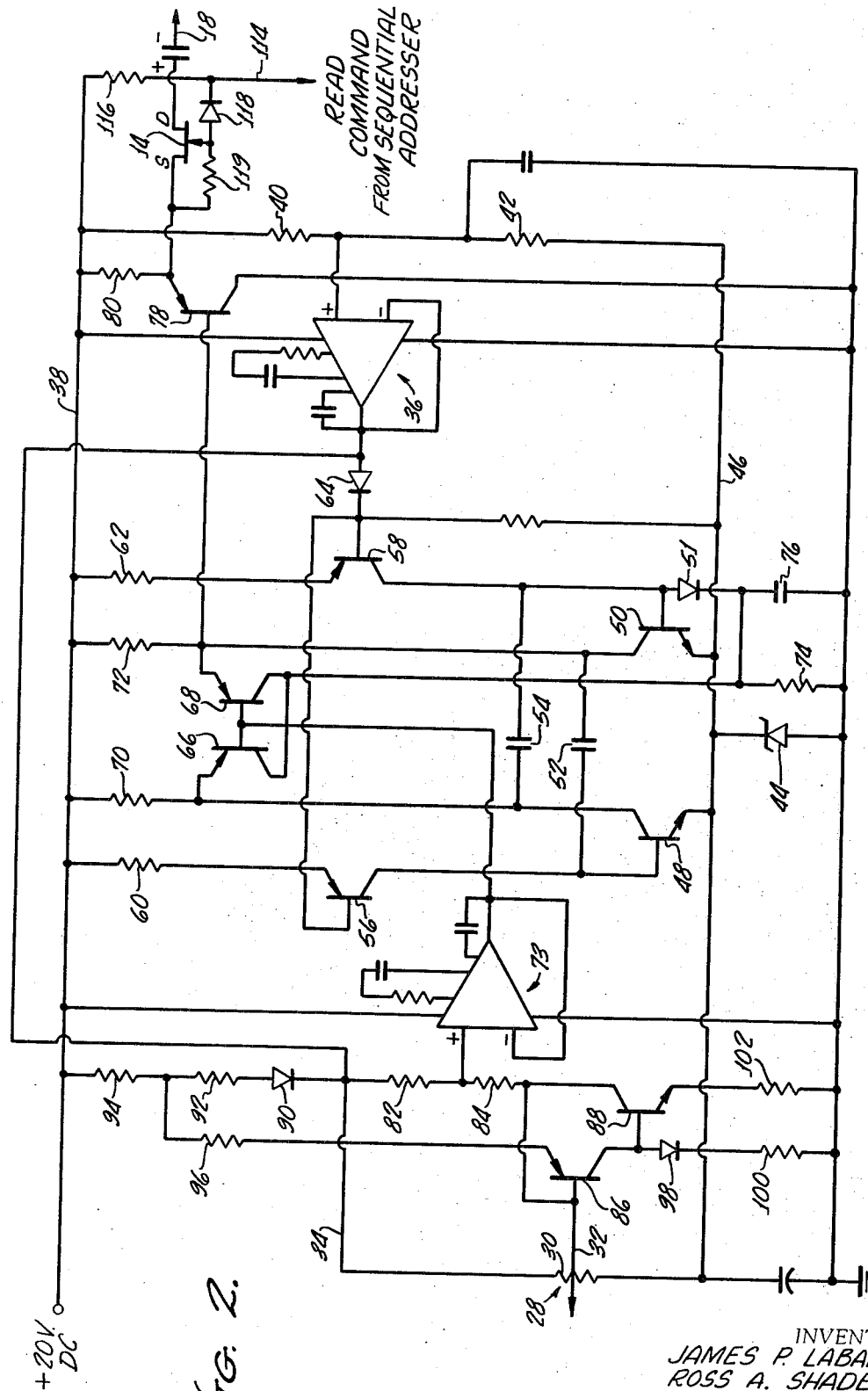
FIG. 2 comprises a circuit diagram of a transducer, time modulator, and a multiplexer switch of a single channel of the system of FIG. 1, FIG. 3 comprises a synchrograph of certain wave forms occurring in the circuitry of FIGS. 1 and 2.

Illustrated in FIG. 2 is a time modulator and multiplexer switch which is packaged to be most conveniently produced as an attachment to and for any one of a number of different types of transducers. A significant advantage of the present invention derives from the fact that it can be readily employed with many different kinds of transducers, including those that are subject to measurement of different phenomena such as pressure, temperature, displacement, magnetic, electrical signals, current, voltage, resistance, and the like. In fact, most transducers providing an output signal having a voltage or current level that has a known relation to an input condition may be employed in the system of this invention. In the illustrated embodiment, the analog output of the transducer modulates an oscillator to provide a type of digital signal in the form of a series of immediately adjoining consecutive pulses, each having a duration that is linearly related to the input condition that is sensed by the transducer.

Illustrated in FIG. 2, for purposes of exposition, is a transducer in the form of a linear potentiometer 28 having a resistive portion 30 and a wiper arm 32. The transducer is energized via line 34 from a low impedance source of relatively low voltage, such as 10 volts for example, provided at the output of an operational amplifier 36 (at the right hand side of the figure). Amplifier 36 is fed via line 38 with a D.C. voltage of 20 volts, for example, through a resistive voltage divider network comprising resistors 40 and 42. A second input to the amplifier 36 is fed back from its output whereby the gain of the amplifier is essentially unity, and the amplifier output follows its noninverting input provided at the junction of resistors 40 and 42. The output of amplifier 36 provides not only transducer 10 but all of the other circuit elements of FIG. 2 with a low impedance voltage source whose level is directly proportional to the ratio of the resistors of the voltage divider, and of course, whose level directly follows the D.C. source on line 38.

When power is turned on, the 20 volt supply on line 38 causes current to flow through resistors 40 and 42 and thence through a zener diode 44 which provides a fixed voltage drop of about +5.6 volts to thereby maintain line 46 at this level above the ground.

On the wiper arm 32 of the transducer, there is generated an analog voltage signal having a magnitude directly proportional (within the linearity of the transducer) to the position of the wiper arm on the resistor. This analog transducer output signal is fed through an impedance matching circuit, to be described below, and a modulator isolation amplifier 73 that is substantially similar to the amplifier 36, to provide the control level signal to the time modulator oscillator itself.

The oscillator of this time modulator is a modified free-running multivibrator comprising a pair of NPN transistors 48 and 50 having timing capacitors 52 and 54 cross-coupling the base of transistor 48 to the collector of transistor 50 and the base of the latter to the collector of the former. A pair of PNP transistors 56 and 58 serve as linear charging current sources for the capacitors 52 and 54 respectively and have their collectors connected to the respective capacitors and their emitters connected to the 20 volt supply through resistors 60 and 62 respectively. The bases of transistors 56 and 58 are both clamped by means of a diode 64 to the +10 volt low impedance voltage source at the output of amplifier 36. Since the base to emitter voltage in each of transistors 56 and 58 is approximately +0.65 volts and the voltage from the cathode to anode of the diode 64 is also +0.65, the emitters of these normally conducting transistors are held essentially at the same level as the output of the amplifier 36, which provides the reference level for the circuit in FIG. 2.

Timing control for the duration of each half cycle of this symmetrical stable multivibrator is provided by a pair of PNP transistors 66 and 68 having their bases connected in common to the output of isolation amplifier 73 at which appears a proportional version of the transducer output on the wiper arm 32. Transistors 66 and 68 have their emitters connected to the positive supply voltage on line 38 via emitter resistors 70 and 72 respectively. The collectors of these transistors are connected together and to ground through a parallel RC network comprising resistor 74 and capacitor 76. For timing control, the emitters of transistors 66 and 68 are connected respectively to one side of capacitor 54 and to one side of capacitor 52 whereby the voltage level to which these capacitors may charge is controlled by the voltage level on the respective emitters.

The modified and modulatable free-running multivibrator is an oscillator that produces at its output terminal, the collector of transistor 50, a square wave (83 or 85 or 87, etc., FIG. 3) that has both half cycles thereof equally varied in duration in direct relation to the input control voltage applied to the commonly connected bases of transistors 66 and 68. Thus, either positive or negative going half cycles, or each full cycle may be considered to be the modulated signal or data pulse provided by this time modulator. The basic period of the multivibrator is determined primarily by the size of the capacitors 52 and 54, the collector current provided through transistors 56 and 58, and the voltage level applied to the bases of transistors 66 and 68. By varying the latter, the output signal period is made to vary in direct proportion to the varying base voltage.

OPERATION OF THE OSCILLATOR

For a description of a typical multivibrator cycle, assume that transistor 48 is initially on (saturated) and that transistor 50 is off (nonconducting). Transistor 56 is conducting and its collector current is fed to the base of transistor 48, keeping the collector of the latter substantially at its emitter potential which is the +5.6 volts established by zener diode 44. The collector potential of transistor 50 rises to the emitter potential of transistor 68. As the collector potential of transistor 50 rises, capacitor 52 charges through resistor 72 until its charge reaches the clamping potential established by the emitter of transistor 68. At this time, current through resistor 72 is diverted through the transistor 68 emitter to collector path and thence through resistor 74 to ground. The voltage drop caused by this current across resistor 74 is sufficient to back-bias a diode 51 connected between the base of transistor 50 and capacitor 76 and maintain this diode back-biased throughout the remainder of this half cycle.

Initially, the base potential of transistor 50 is at about −5 volts with respect to its emitter. That is, at the beginning of this half cycle, there is sufficient reverse bias to keep transistor 50 in its nonconducting condition. With both transistor 50 and diode 51 cut off, transistor 58 conducts its collector current into capacitor 54 to discharge this capacitor at a linear rate.

This linear discharge of capacitor 54 which raises the potential on the right side of this capacitor as illustrated in FIG. 2 thus begins to raise the potential at the base of transistor 50 which eventually reaches its turn-on potential, which is about +0.5 volts with respect to its emitter. The time required for this discharge of capacitor 54 by means of the collector current of transistor 58 is determined by the initial charge across capacitor 54 and the magnitude of the discharge current from the collector of transistor 58.

$$T = C\,(dV/I) \tag{1}$$

where
I = discharge current
T = discharge time
C = the capacitance being discharged
dV = voltage change during discharge When transistor 50 starts to conduct, the first half cycle described above is terminated and the second half cycle immediately commences, the multivibrator being instantaneously switched into its second state. As transistor 50 starts to conduct, its collector potential drops. This drop in collector potential is coupled through capacitor 52 to the base of transistor 48 which then begins to conduct less. As it conducts less, its collector potential rises, coupling the rising potential through capacitor 54 to the base of transistor 50 to cause the latter to conduct more. Thus a regenerative action occurs causing an almost instantaneous turn off of transistor 48 and turn on, to full conduction, of transistor 50.

It will be recalled that the charge on capacitor 52, that is the potential on the right hand side of this capacitor as illustrated in FIG. 2, was at a level determined by the emitter potential of transistor 68. Now, as transistor 48 is no longer conducting, the linear discharging transistor 56 conducts its collector current into capacitor 52 to discharge this capacitor at a linear rate until the left side of capacitor 52 reaches the turn on potential required at the base of transistor 48 (about +0.5 volts with respect to its emitter).

Again, the time required for the linear discharge of capacitor 52 is determined by the initial charge across the capacitor which was determined by the emitter potential of transistor 68 and the magnitude of the lienar discharging current from transistor 56, in accordance with Equation (1).

As transistor 48 begins to conduct its collector potential goes down, transferring a negative going signal through capacitor 54 to the base of transistor 50 which begins to conduct less. As this transistor conducts less, a positive going potential at its collector is transmitted through capacitor 52 to cause a further increase in conduction of transistor 48. Thus, there is a regenerative switching action which again occurs to now cause transistor 48 to conduct at saturation and to maintain transistor 50 entirely cut off.

As indicated previously, the total elapsed time $T_t$ for both half cycles is $$T_t = T_1 + T_2 = C_{52}\,(dV/I_C) + C_{54}\,(dv/I_C) \tag{2}$$

where
$T_1$ = the duration of one half cycle of the multivibrator
$T_2$ = the duration of the other half cycle of the multivibrator
$C_{52}$ = value of capacitor 52
$C_{54}$ = value of capacitor 54
$I_C$ = current from transistor 56
$I_C$ = current from transistor 58

Since the linear discharging current $I_C$ is equal to the linear discharging current $I_C$ and the two voltage changes dV in the numerators of the two terms on the right side of Equation (2) are equal to each other, it follows that the total time of the oscillator cycle $$T_t = T_1 + T_2 = (C_{52} + C_{54}) \times (dV/I_C)$$

where $$I_C = I_C = I_C$$

These equations are based upon an input to the modulator that has, for the frequencies of interest, an effective nonvarying voltage level. Nevertheless, each half cycle of the oscillator has a width (duration) that is determined by the base voltage at transistors 66, 68 at a specific instant in time, substantially independent of the relative frequencies of oscillator and rate of change of transducer output. In effect, the modulator takes an essentially instantaneous sample at intervals proportional to the sampled signal and produces a time proportional pulse.

Thus, it will be seen that the modulator generates a fluctuating signal having repetitive full cycles of basic duration and having mutually equal basic duration positive going and negative going half cycles. The information signal that is applied to the commonly connected bases of transistor 66 and 68 time modulates the fluctuating signal to change the duration of each of its half cycles by an amount directly proportional to the information signal.

Thus the pulse duration time can be modulated linearly by varying the dV term in the numerator of Equation (2). This is accomplished by varying the voltage level at the bases of transistors 66 and 68. Since the pulse time duration of the multivibrator is proportional to the voltage level at the bases of transistors 66 and 68, and this level is linearly controlled by the output of transducer 28 through amplifier 73, the pulse time duration at the oscillator output varies proportionally and linearly with transducer output variations. This relation is illustrated in FIG. 4.

The oscillator output is fed the base of a PNP transistor 78, having its collector tied to ground and having its emitter connected to the positive supply through a resistor 80. This transistor acts as an emitter follower to feed the multiplexer switch of this transducer-time modulator channel as will be more particularly described in connection with FIG. 5. Thus it will be seen that there appears at the output of the oscillator and at the emitter of transistor 78 a time modulated signal such as illustrated at 83 in FIG. 3. This output comprises a series of square waves having equal duration half cycles of which each has a duration equal to the duration $t_{x1}$ that is directly proportional to the output of the transducer of channel 1. Should the transducer output vary or where a different transducer is monitoring a different condition as is the case with the channel 2 transducer, the data output at the emitter of transistor 78 of the ocrresponding channel takes the wave shape illustrated at 85 in FIG. 3. In this case, the modulator output comprises a series of square waves having equal half cycles indicated by the duration $t_{x2}$ which in turn are each linearly proportional to the condition being monitored by the transducer of this second channel.

Figure 4:
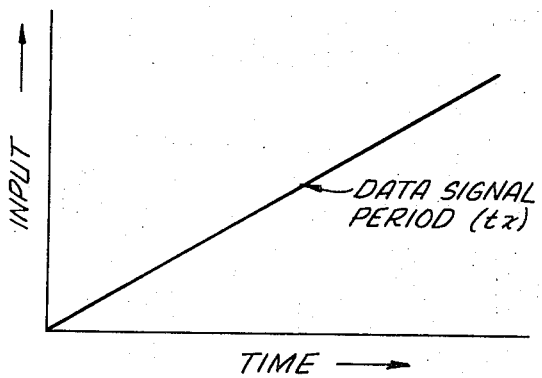
FIG. 4 illustrates the substantially linear relation of the data signal period to the input information to be transmitted.

Thus it will be seen that the relation between the output of any channel and the phenomenon that is being monitored by the channel transducer follows the linear relation illustrated in FIG. 4. The data signal provided by the oscillator comprises a repeatedly fluctuating modulated signal that has a period linearly related to the magnitude of the analog input to the channel. The output of each modulator is a set or series of discrete pulse signals. These pulse signals define time periods or frames that are mutually discrete yet chronologically contiguous, that is, one frame follows immediately after the other. These signals are generated in sets of consecutive pulses of which a consecutive group of pulses may be sampled, as by operation of the multiplexer switch 14, to provide the desired information out of the individual channels.

IMPEDANCE CONVERSION

The transducer output has a varying source impedance to a given load as the wiper moves from one end of the potentiometer resistance 30 to the other. A voltage divider comprising resistors 82 and 84 provide a fixed load to the transducer output on arm 32 and provide the input to isolation amplifier 73. The combination of fixed load and varying transducer source impedance causes an undesired non-linearity of transducer output. The degree of nonlinearity is proportional to the source impedance change as compared to the load impedance.

To eliminate any loading on the wiper arm of the transducer, the total required current into the load is provided from a different source. This function is achieved by complementary transistors 86, 88, and associated circuitry. A voltage divider action is provided by a diode 90 and a pair of resistors 92 and 94, the emitter of PNP transistor 86 being connected to this voltage divider via a resistor 96. The purpose of this divider is to cancel the base to emitter voltage drop on transistor 86, about 0.65 volts, and to insure a minimum current in resistor 96 when the transducer wiper arm 32 is at its extreme upper point where it is sensing a voltage level as applied on line 34. The base of transistor 86 is connected directly to the wiper arm. The voltage on the base and also on the emitter of this transistor will vary directly as a function of the transducer output. The collector of transistor 86 is connected to ground through a diode 98 and a resistor 100 and is also connected directly to the base of an NPN transistor 88. The latter has its emitter connected to ground via a resistor 102 and has its collector connected in a feedback arrangement to the bottom of the voltage divider comprising resistors 82 and 84 and also directly connected to the base of a transistor 86.

In operation, assume the input to the transducer is such as to cause the voltage on its wiper arm to go up. The current into the load resistors 82, 84 decreases proportionally because the voltage across these resistors is reduced. Thus transistor 86, a PNP transistor, conducts less and accordingly, the base of transistor 88 goes down. This NPN transistor likewise conducts less. The increment of decrease in collector current of transistor 88 compensates for and is substantially equal to the increment of decrease in load current that would otherwise flow through the wiper as the wiper voltage goes up. Thus less current is fed to the base of transistor 86 and there is provided, in effect, a positive current feedback in an amount equal to the load current. This appears as an increase in load impedance and insures a linear transducer output to the load for any setting of transducer 28.

The current through transistor 86 which is determined by the value of a resistor 96 and the transducer output voltage causes a proportional IR drop across resistor 100 in the collector circuit of transistor 86 plus a fixed voltage drop across the diode 98. Since the base of transistor 88 is connected to the anode of diode 98 and its base to emitter voltage drop is equal to the voltage drop across the diode, the voltage across resistor 100 is equal to the voltage drop across the emitter resistor 102 of transistor 88. Thus by selecting the appropriate values for resistors 96, 100, and 102, the collector current of transistor 88 into the load will be equal to the current taken out of the transducer to be supplied to the load, leaving zero net current in the wiper arm of the transducer for any setting of transducer arm 32.

IMMUNITY TO POWER SUPPLY VARIATIONS

The output of a transducer when enerigized from a power supply or other voltage source is determined by the voltage across its resistive element. The energizing voltage, of course, must be known and must remain substantially constant before any meaningful data can be obtained. Alternatively, one must compensate for variations of the energizing voltage. Ordinarily, a regulated stable power supply is required if a truly proportional measurement is to be made. The time modulator circuit of FIG. 2 performs this function without regulation of the main power supply and produces an output pulse duration truly proportional to transducer setting. The output pulse duration is made virtually immune to reasonable power supply variations as will be seen from inspection of the circuitry of FIG. 2.

If, for instance, the +20 volt D.C. supply to the circuit is reduced by a given amount, the low impedance 10 volt reference provided at the output of amplifier 36 is reduced by a proportional amount due to the voltage divider action of resistors 40 and 42 and the voltage follower action of the amplifier 36. Since the output of the amplifier is the source of transducer excitation voltage, the transducer voltage level output is reduced by a like amount. The clamping voltage level on the commonly connected bases of transistors 66 and 68, which determine the final charge on capacitors 54 and 52, also are reduced by the same amount as the reference level at the output of amplifier 36. This would reduce the pulse time duration if the capacitance current remained the same (see Equation (1)). However, the voltage provided to emitter resistors 60 and 62 of the linear charging circuits of transistors 56 and 58 is also reduced by the same percentage. Thus the charging currents for the timing capacitors 52 and 54 are likewise reduced by an equal percentage and no net change in the output period due to power supply fluctuation occurs.

Since $C_{52}$ and $R_{60}$ do not vary with power supply variations, the output pulse duration is immune to such voltage variations.

It will be seen then that the use of the same reference voltage to energize the transducer and to control the voltage level control of the multivibrator timing (as controlled by transistors 66 and 68) causes the same sense of incipient variation in the output signal in response to a fluctuation of the reference voltage. However, this incipient fluctuation is compensated for by the fact that the linear charging current itself is varied in accordance with the same voltage fluctuation whereby the total period remains the same.

SEQUENTIAL ADDRESSER

Figure 5:
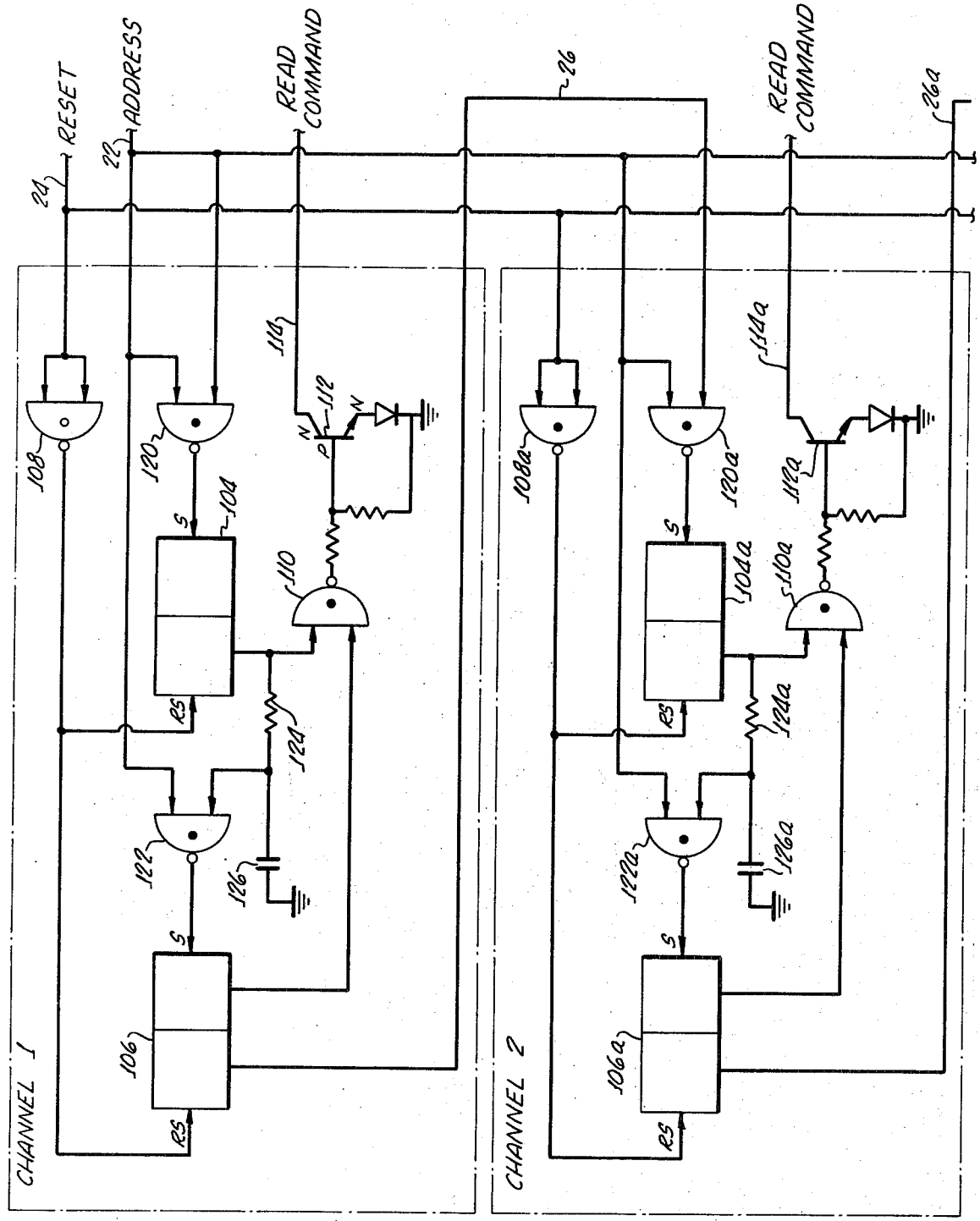
FIG. 5 is a block diagram of two channels of the sequential addresser of FIG. 1.

The sequential addresser, two channels of which are illustrated in FIG. 5, comprises a portion of the circuitry of the attachment which includes the time modulator illustrated in FIG. 2. Thus an attachment to be provided for an individual transducer will include all of the circuitry of FIG. 2 less the transducer, and in addition, will include the sequential addresser of FIG. 5, all packaged in a suitably convenient unit for attachment to the transducer on the one end and for connection in common with other transducer and data handling channels on the other end to a common address control such as illustrated at 20 in FIG. 1. Variations in the packaging, the number of channels, and the type of transducers employed all may be affected and selected to suit specific application without departing from the scope of this invention.

Each channel of the sequential addresser is identical to each other channel except for a unique aspect of the first channel to be more particularly described. The addresser includes a pair of set and reset flip-flops 104 and 106, both of which are initially placed in reset condition by a pulse received from a NAND gate 108. The latter is a conventional inverting coincidence circuit which, upon receipt of two high inputs at its two input terminals, provides a low output signal. In the absence of coincidence of two high input signals, the gate provides a high output signal. For practical and functional purposes, a gate is not necessary to receive the reset pulse incoming to the sequential addresser for any channel but is employed in this arrangement because of the ready availability of a circuit containing a number of similar NAND gates and flip-flops. Thus a high pulse 241 (FIG. 3) on reset line 24 from the address control 20 (see FIG. 1) is passed through the NAND gate 108 to reset both flip-flops 106 and 104 whereby a second NAND gate 110 will receive a low input from the output of the RS (reset) side of flip-flop 104 but receives a high output from its connection to the S (set) side of flip-flop 106. Accordingly, an addresser output transistor 112 having its base resistively coupled to the output of NAND gate 110 receives a high signal and therefore conducts.

The collector of transisor 112 is connected via lead 114 and resistor 116 (FIG. 2) to the supply of 20 volts D.C. Multiplexer switch 14 comprises a field effect transistor (FET) having drain and source electrodes connected to data line 18 and the emitter of transistor 78 respectively and having its gate electrode biased via a resistor 119 and connected to read command line 114 through a diode 118. Accordingly, when transistor 112 is conducting by virtue of the high level output from NAND gate 110, the diode 118 is forward biased and the collector current in transistor 112 causes a voltage drop across resistors 116 and 119 which are connected to the gate electrode of the field effect transistor (FET) 14 which is thus cut off. In this condition when all sequential addresser flip-flops are in the reset condition, all multiplexer switches 14 – 14n are open (all FET switches are cut off) whereby no data is transmitted to data line 18.

After the reset pulse, a first address pulse 221 (FIG. 3) on line 22 from the address control 20 is fed in common to the sequential addressers of all channels. For channel 1 uniquely, the address pulse is fed as both inputs of a third NAND gate 120 which accordingly provides a low output to the set side of flip-flop 104 to set this flip-flop. When flip-flop 104 is set, its output to the NAND gate 110 becomes high (FIG. 3), and having as a second input the retained high output from flip-flop 106, this NAND gate now provides a low output to the base of transistor 112 to cause this transistor to cease conduction. When transistor 112 is cut off, the cathode of diode 118 rises and this diode is back-biased to cut off. The signal on the gate electrode of field effect transistor 14 is raised to the potential of the source electrode of transistor 14, which causes this transistor to conduct. Thus the multiplexer switch of the first channel is closed uniquely upon receipt of the first address pulse whereby data pulses 83 from the output of time modulator 12 are now passed through the multiplexer switch 14 to the data line 18.

As will be more particularly described below, the address control proceeds to count a predetermined number of time modulated periods or data pulses, and upon completion of such count, sends out a second address pulse 222 (FIG. 3) via line 22. This second address pulse also passes through the NAND gate 120 but has no effect upon flip-flop 104 which is already set from the previous address pulse. The second address pulse is also transmitted directly to a fourth NAND gate 122 of the sequential addresser which receives as its second input a high pulse from flip-flop 104 when the latter is set. However, because of the interposition of a time delay comprising resistor 124 and capacitor 126 between the flip-flop 104 and the NAND gate 122, the high pulse which is produced by flip-flop 104 when the latter is set is not coupled to the NAND gate 122 until some time after the first address pulse has terminated. Accordingly, the output of NAND gate 122 becomes true (low) only upon receipt of the second address pulse 222. Thereupon, flip-flop 106 is set and the input from this flip-flop to NAND gate 110 goes low. Accordingly, the output of NAND gate 110 is high, transistor 112 conducts, and the multiplexer switch 14 is opened to prevent transmission of further data pulses from channel 1. Both flip-flops 104 and 106 will remain set throughout subsequent address pulses until the next recycling of the multiplexer as indicated and commanded by the next reset pulse on line 24.

Upon receipt of the second address pulse, flip-flop 106 is set whereby the reset (RS) side thereof which is connected to the transfer out line 26 goes high. Accordingly, a high input is provided to the second input of a NAND gate 120a of the channel 2 sequential addresser. This NAND gate also receives each address pulse from the common address line 22. It will be seen that channel 2 which is identical to all subsequent channels receives inputs to its NAND gate 120a on two different lines, the first being from the transfer out line 26 of the preceding channel and the second being from the common address line. Channel 1 sequential addresser is unique in this respect in that it receives no transfer out signal from any other channel but rather receives both inputs to its NAND gate 120 from the common address line 22. Except for the different arrangement of inputs to NAND gate 120a, the sequential addresser of channel 2 and the sequential addressers of all other channels are identical to each other and to the channel 1 sequential addresser. Thus, the sequential addresser of channel 2 includes flip-flops 104a, 106a, additional NAND gates 108a, 122a, and 110a, delay network 124a, 126a, and addresser output transistor 112a, having a read command output line 114a connected to the diode and gate electrode of the multiplexer switch 14a of the second channel of the transducer time modulator data handling system. Thus, upon receipt of the second address pulse 222 from the address control 20, data pulses 83 from channel 1 are terminated and data pulses 85 from channel 2 are then transferred via the data line 18 to the address control. The latter now proceeds to count the predetermined number of data pulses 85, and upon completion of such count, sends out the next address pulse 223 which accordingly terminates data from channel 2 and initiate readout of data pulses 87 from the next channel. It will be recalled that the data pulses are time modulated whereby the period of each pulse is dependent upon the information to be transferred. Accordingly, it will be understood that the sampling or readout time for any one channel will vary as determined by the address control which counts a selected number of the period modulated data pulses. Although but three channels are shown in FIG. 3 for convenience of exposition, it will be understood that any feasible number of channels may be employed, such number being limited only by practical considerations such as recycling and access time to each channel.

ADDRESS CONTROL

Figure 9:
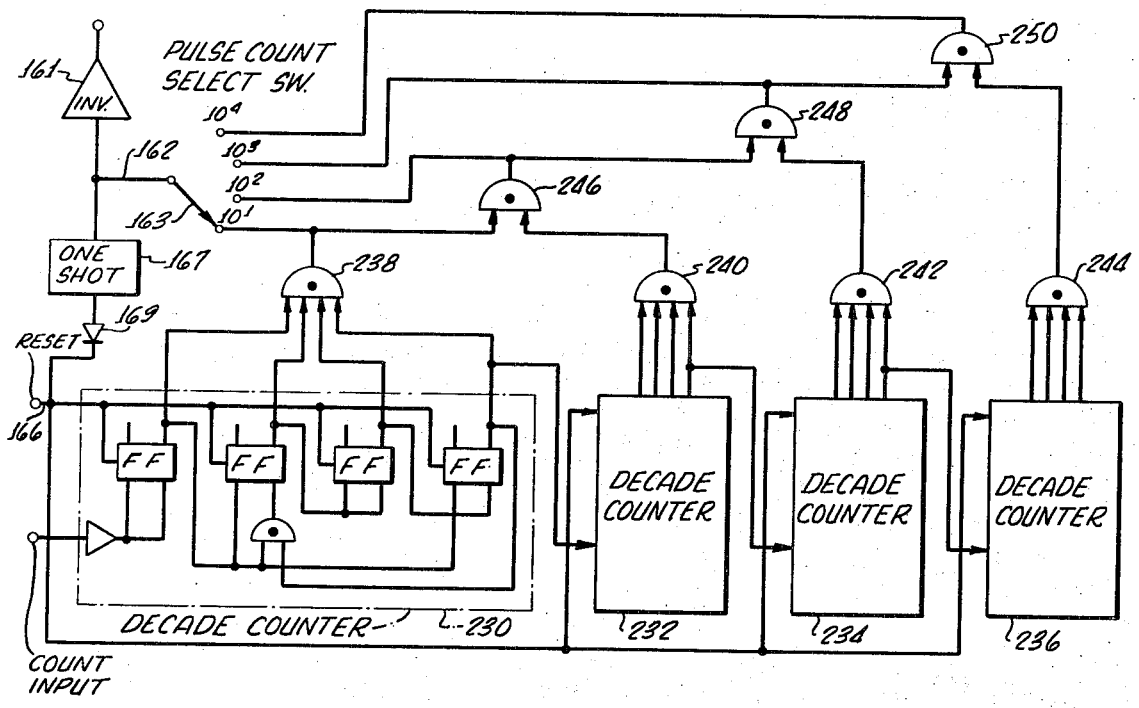
FIG. 9 shows additional detail of the decade counter and logic therefor.
Figure 6:
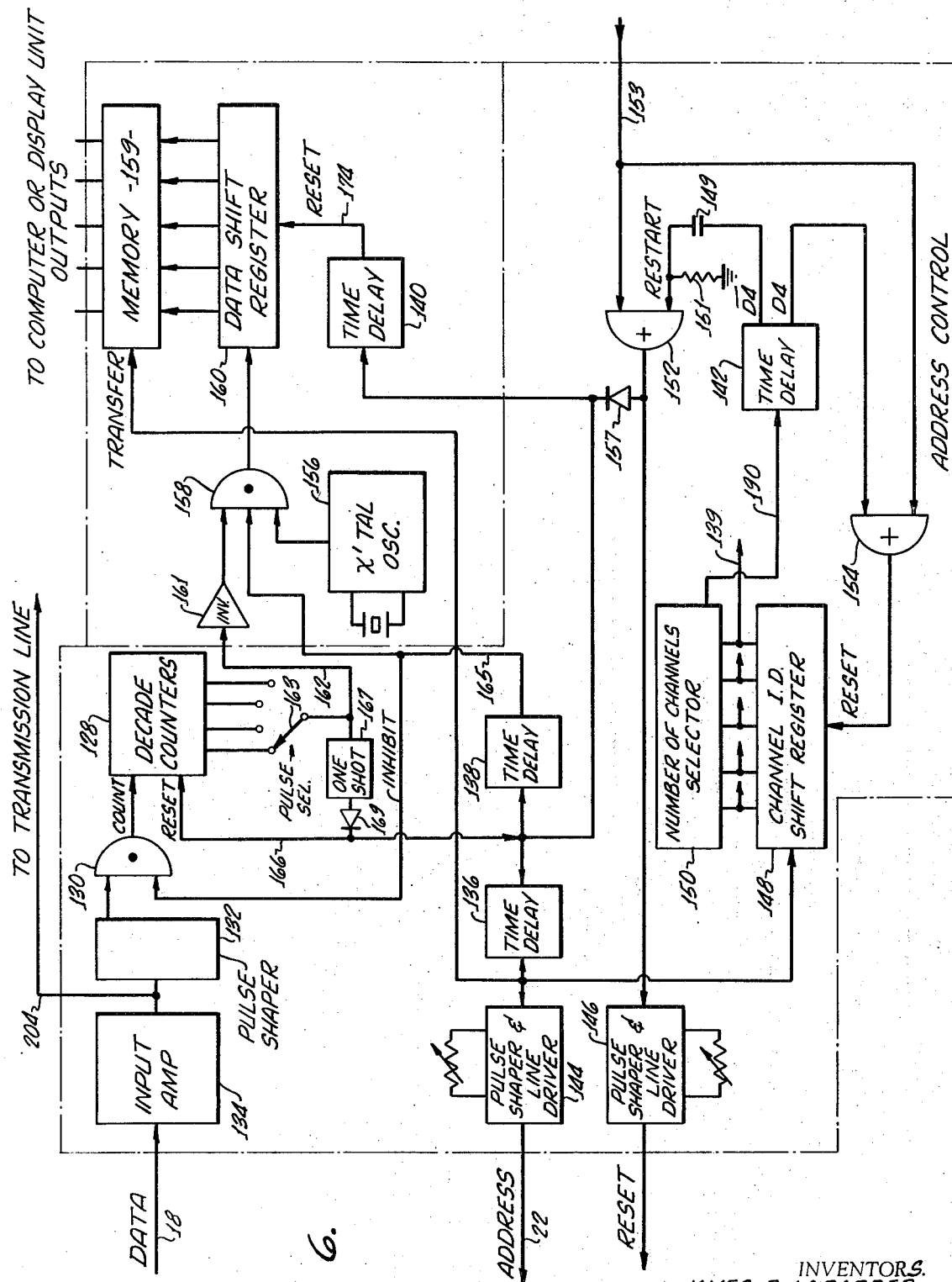
FIG. 6 shows additional detail of the address control and digital translator of FIG. 1.

The address control 20 is more particularly illustrated in FIG. 6 and comprises a group of decade counters 128 and associated logic described in detail in FIG. 9. The counters 128 count data pulses received from an AND gate 130 via a pulse shaper 132 and an input amplifier 134 which receives data pulses on the data line 18 from the various multiplexer switches. Several conventional one-shot (monostable) multivibrators 136, 138, 140, and 142, provide delay intervals identified as $D_1$, $D_2$, $D_3$, and $D_4$, respectively (FIG. 7). The address control also includes a pair of pulse shapers and line drivers 144 and 146 which provide respectively address and reset pulses on the address control ouptut lines 22 and 24.

The address control also includes a channel identification shift register 148 and a number of channels selector device 150. Individual channels being handled at any given time are identified by shift register 148, and the end of one complete multiplexer cycle is signaled to the time delay 142. Also included in the address control are input OR gates 152 and 154.

The address control cooperates with a digital translator, also illustrated in FIG. 6. The latter comprises a crystal oscillator 156 that provides a train of high and precise repetition rate clock pulses 180 (FIG. 7) to an AND gate 158 which gates these pulses to a data pulse shift register 160 for subsequent transfer into a substantially conventional memory 159. The third time delay one-shot 140 is a part of the digital translator circuitry.

The address control and digital time translator may be powered by the same power supply that energizes the transducers and time modulators. The system may be operated completely automatically and provide data to and be controlled by a remote computer.

OPERATION OF ADDRESS CONTROL

A high level pulse on start command line 153 at the right side of FIG. 6 is provided, either manually or by automatic computer control, to the OR gate 152 which provides an output pulse 243 (FIG. 7) via pulse shaper and line driver 146 to the reset line 24 whereby all flip-flops of each of the sequential addressers (FIG. 5) are reset. The start command also provides, via OR gate 154, a reset command to the channel identification shift register 148 which accordingly is set to zero. The start command pulse at the output of OR gate 152 is also fed via a diode 157 to trigger one-shots 136, 138, and 140 whereby the time delays $D_1$, $D_2$, and $D_3$ are each initiated as will be readily observed in FIG. 7. This start time and initiation of each of the delay intervals is designated in the drawing as $t_0$. At $t_1$, the end of delay time $D_1$, one-shot multivibrator 136 feeds a signal to pulse shaper 144 which produces the first address pulse 221 to turn on the multiplexer switch 14 in channel 1, whereby data pulses 83 are now supplied to data line 18 from the first channel. It will be seen that these data pulses 83 are also shown as pulses upon the data line 83 of FIG. 3, and each has a duration of $t_{x1}$ which is directly proportional to the analog information sensed by the channel 1 transducer.

At $t_3$, the end of the $D_2$ time delay from one-shot 138, an inhibit pulse at the output thereof on line 165 is removed whereby the AND gate 130 is enabled. This gate and gate 158 are both inhibited by one-shot 138 for the interval $D_2$. At time $t_3$, data pulses 83 from channel 1, supplied via input amplifier 134 and pulse shaper 132, begin to pass through the enabled gate 130 which thus provides pulses 172 (FIG. 7) for counting by the decade counters 128. These counters (FIG. 9) comprise as many serially connected decade counter units as required to count a desired maximum number of data pulses. FIGS. 6 and 9 indicate $10^4$ data pulse counts may be selected by a count control switch 163, but more decades may be added if required.

As illustrated in FIG. 9, the decade counter and its associated logic include four conventional modulo 10 or decade counter circuits 230, 232, 234, and 236, each including a group of flip-flops connected to provide counts of 10, 100, 1,000, and 10,000. Such decade counters, as well known, count each input pulse and upon receipt of each tenth pulse reset all flip-flops to zero. Upon counting the last count of each group of ten counts, each lower order counter provides an output pulse to the input of the next higher order counter. The zero count of each of the decade counters is manifested by an output from each of its flip-flops to respective AND gates 238, 240, 242, and 244. The various decade counter AND gate outputs are in turn ANDed in gates 246, 248, and 250 to provide the end of count signal on the various count selector terminals. Thus for the first order decade, for example, when a count of 10 is desired, the selector switch 163 is in the position illustrated in FIG. 9, and a high output appears on line 162 when the tenth count occurs. The high output is inverted in an inverter 161 which provides an enabling input to the AND gate 158 (FIG. 6) during any of counts one through nine and disables the gate 158 upon the tenth count. The high signal on line 162 is also fed to a one-shot multivibrator 167 to provide a positive going signal via a diode 169 to the reset line 166 of all flip-flops of all of the decade counters. As previously indicated this signal is also fed to trigger each of the time delay devices 136, 138, and 140 (FIG. 6) upon occurrence of the selected last count.

The decade counters provide on an output line 162 a gate pulse 164 (FIG. 7) which is initiated by the first data pulse provided to the counters and which terminates upon the completion of its preselected number of counts. Termination of this gate pulse also resets the decade counters. The counters are arranged to provide selectively a count of 10, 100, 1,000 or 10,000 in this exemplary embodiment. The manually operable count control switch 163 is illustrated as set to cause the counter to count ten data pulses. This provides on line 166 via a one-shot multivibrator 167 and a diode 169 a reset pulse that rises upon completion of the decade counter count, thus resetting all flip-flops within the counter and readying the counter for another count cycle.

The output of one-shot 136 at time, $t_1$, the end of delay time $D_1$, is caused to provide a memory transfer pulse 168 and a channel identification update pulse 170 by suitable pulse shaping circuitry (not shown) whereby the transfer pulse 168 will cause data from the data shift register 160 to be transferred into memory 159 and the update pulse 170 will cause the channel ID shift register to shift to its next count. The shift registers are substantially conventional devices which update their counts upon receipt of each input pulse, pulse 170 in the case of register 148 and gated clock pulses from AND gate 158 for register 160.

A variety of ways of identifying data from individual channels are known to those skilled in the art. For example, it is merely necessary to note the beginning of each full multiplexer cycle and then provide in the data processing computer a counter that keeps track of the switching from one channel to the next. Nevertheless, it will be readily appreciated that identification signals which designate each of the several channels that are currently being sampled at any given time are readily available from the channel identification shift register outputs as indicated on lead 139.

At time $t_2$, the end of the $D_3$ time delay, a data shift register reset pulse 174 is produced and fed to the data shift register 160 to reset the latter to zero, thus readying the register for another count cycle.

The decade counters 128 now proceed to count the preselected (selected by switch 163) number of pulses 172, there being one count for each of the pulses 83 on data line 18. When a count of 10 of these has been accumulated, the decade counter gate pulse on line 162 terminates and the decade counter is reset to zero. The gate 158 is no longer enabled, and time delays $D_1$, $D_2$, and $D_3$ are all initiated. Thus it will be seen that the total count of the selected number of data pulses accumulated by the decade counter 128 controls the occurrence of time $t_4$ when a new set of delay intervals is initiated to begin the switching of the system to the second channel of the multiplexer.

During the time interval between $t_3$ and $t_4$, when the decade counters gate signal enables AND gate 158, there is no inhibit signal from the output of one-shot 138 on line 165 whereby the train of high frequency, fixed repetition rate pulses 180 from the precision crystal controlled oscillator 156 is transmitted through the gate to be accumulated by the shift register 160.

When AND gate 130 is enabled at the end of time delay $D_2$, the very next shaped data pulse from pulse shaper 132 is passed through gate 130 as the first of the group of pulses 172 and the decade counter counts its first count, whereby immediately the counter output line 162 provides the gating signal to gate 158. The final decade counter pulse, the tenth pulse, with the selector switch 163 in the illustrated position, disables gate 158, lowering the output to this gate and thus inhibiting any further clock pulse input into the data shift register 160. This final decade counter pulse provides a temporarily rising potential on line 166 which triggers the one-shots 136, 138, and 140 to initiate another channel readout.

Just as in the initiation of the first channel readout, the second channel readout is controlled by the several time delays. Upon termination of delay $D_1$, which for the second channel readout is initiated at time $t_4$ illustrated in the synchrograph of FIG. 7, a second address pulse 222 is initiated to open the multiplexer switch 14 of the first channel and to close the multiplexer switch 14a of the second channel whereby data pulses from the latter are applied to the data line 18.

Data pulses from the second channel, pulses indicated at 85, each has a greater width than the corresponding pulses 83 of the channel one data pulses, thereby indicating in this example that the magnitude of the condition sensed by the channel two transducer 10a is greater than the magnitude of the condition sensed by the channel one transducer 10. As previously explained and illustrated in connection with FIG. 3, the relation between the various sensed conditions and the duration of each pulse or the duration of each half cycle is linear.

Just as in connection with initiation of the channel one portion of the operation, the data pulses from channel two begin to appear on data line 18 substantially simultaneously with the beginning of the second address pulse 222 whereas the initiation of the channel two gate 165 begins at time $t_7$, the end of the second $D_2$ time delay. The decade counter provides the gate signal 165 at its output which thus enables gate 158, the latter no longer inhibited by an output from oneshot 138, whereby the clock pulses 180 from oscillator 156 are passed through the gate 158 to be accumulated by the data shift register which had been once again reset, at time $t_6$, by the termination of time delay $D_3$. At time $t_5$, the end of the second time delay $D_1$, a second memory transfer pulse 182 and a second channel identification update pulse 184 are provided to respectively transfer the information from the shift register into the memory 159 and to update the channel identification shift register. The latter now provides an output signal on line 139 that identifies the second channel. Subsequently, at the end of the second interval $D_3$, a second data shift register reset pulse 186 is provided to reset register 160.

The decade counters 128 now count pulses 173 produced at the output of AND gate 130. Pulses 173 have the same pulse width as pulses 172 but there is a period between pulses 173 which is determined by the period of the channel 2 data pulses 85. The decade counters count the preselected number (ten in this illustration) of such data pulses and upon completion of this count, the gate signal on line 162 terminates to disable the clock gate 158 whereby no further clock pulses will be passed to or accumulated in the data shift register. Concomitantly with the termination of the clock gate pulse, the reset signal on line 166 from the decade counters rises to reset the decade counters and to again initiate the time delay of the one-shot multivibrators 136, 138, and 140. Thus the third sampling and readout starts and this stepping from channel to channel continues with the sampling time for each channel being controlled in accordance with the duration of the time modulated data pulses. In an arrangement where the decade counter is set to count 10 pulses, the sampling time for each channel will be substantially equal to the total duration of ten immediately consecutive periods of the individual data signal. Thus the sample time for channel 1 starts at $t_1$ and terminats at $t_4$, a total time equal to 10 times the width of each full cycle of pulses 83. The sample time for channel 2 starts at time $t_7$ and terminates at a time that follows $t_7$ by an interval equal to 10 times the width of each full cycle of pulses 85.

The number of channels selector 150 comprises a group of digital switches which are collectively set manually to identify the number of the last channel of a desired multiplexer cycle. For example, if 100 channels of data handling information are to be employed and each is to be sampled during a single multiplexer cycle, the selector 150 would be set to indicate the number 100 whereby when the channel identification shift register 148 reaches the identification count of 100, a coincidence exists between the address set into the number of channels selector 150 and the identification code contained in the shift register whereby an output on line 188 is produced by comparators (not shown) within selector 150 indicating that the last channel has been sampled. This last channel count signal, appearing as a pulse 190, as illustrated in FIG. 7, initiates the time delay $D_4$ of one-shot multivibrator 142. The positive going $D_4$ output terminal of one-shot 142 passes through OR gate 154 thus resetting the channel ID shift register 148 to zero immediately upon initiation of $D_4$ time delay. After the time delay $D_4$ has elapsed, a positive going differentiated pulse is generated by the positive going edge of the $\overline{D_4}$ output terminal and the differentiating action of capacitor 149 and resistor 151. The $\overline{D_4}$ terminal of the one-shot is always high when $D_4$ is low and vice versa, a conventional multivibrator arrangement. The differentiated restart pulse provided by the time delay $D_4$ is fed through OR gate 152 to start a new multiplexer cycle of consecutive channel sampling which will be identical to the last complete cycle just described. In such a cycle, it will be recalled that the sampling time for each channel will vary according to the magnitude of the particular information and the durations of the time modulated pulses representing the information handled by such channels.

The system will recycle when the last channel, as identified by a number manually established in channels selector 150 has been sampled. Thus not only will the sampling time for different channels vary, but the total cycling time will also vary.

Assuming that an average or midrange data pulse will have a duration of 100 microseconds, e.g., a 100 microsecond modulation period is directly proportional to the midrange value of a condition to be sensed by the transducer, and that the full range time variation will be plus or minus 10 percent, then the time delays may be chosen such that $D_1$ is on the order of 200 microseconds, $D_2$ on the order of 600 microseconds and $D_4$ on the order of 1,000 microseconds. Thus with the decade counter set to count 10 data pulses, the time of sampling for one channel would be $10D_d + D_2$, where $D_d$ is the duration of a data pulse from a given channel. The total time required for one full cycle including the recycling logic time provided by $D_4$ time would be equal to $N(10D_d + D_2) + D_4$ where N is the total number of channels in one multiplexer cycle.

For increased resolution of the digitization of the time modulation, the individual multiplexer sampling times may be increased. This is most conveniently achieved with the illustrated arrangement by the operation of the data pulse selector switch 163 of FIG. 6. Simply by increasing the sampling time the number of increments or bits that are fed into the data shift register 160 during a given sampling time will be increased to increase the digital resolution. Alternatively, for any given sampling time or for any given number of consecutive time modulated data pulses, the frequency of the crystal oscillator 156 could be increased to also provide a significantly increased resolution of digitization. Thus it will be seen that with the time modulation arrangement, that is, the use of information linearity in the time domain as provided in the practice of this invention, the data transmission can employ a similar portion of the frequency spectrum as would be required for the conventional frequency modulation but can provide the same information content 1,000 times faster. For example, in a conventional 10 kilohertz frequency modulation system, it will require one second to obtain a count of 10,000 in a conventional digital frequency counter. On the other hand, with the use of a system built according to this invention where the midrange durations of the data pulses are such as to cause generation of 10,000 such data pulses in one second, and further, with the use of a repetition rate of the oscillator clock 156 of 10 megahertz, the described sampling period which samples but 10 of the data pulses would provide 10,000 counts. Ten of such data pulses would occupy a sampling time, at midrange values, of substantially 1 millisecond. In such an arrangement if a still greater resolution were required, the clock 156 could be changed to provide a 100 megahertz clock rate, for example, whereby 100,000 counts would be provided for each sample of 10 data pulses. Such precision and resolution is not available in the ordinary frequency modulation system and could not be achieved with a conventional pulse width modulator since the latter operates at a fixed frequency or repetition rate and conveys no information between the duty cycle periods. With the system of the present invention, continuous transmission is available. If noise in the system increases, it is merely necessary to increase the sample time.

REMOTE CONTROL AND TRANSMISSION

As illustrated in FIG. 1, the digital translator 21 may be connected directly to the address control 20 and both of these may be located in the vicinity of the various information modulating channels. The connection between the address control and digital translator, on the one hand, and the various data handling channels on the other, requires but three lines in addition to the system ground line (not shown). The first is the data line, the others are the address and reset lines. With the illustrated arrangement of multiplexer switch and sequential addresser of each channel in the same package as the modulator and transducer of such channel, the number of lines connecting the address control and the various channels is kept to a minimum. As previously indicated, significant advantages are also achieved, regardless of location of switch or addresser by the packaging of transducer and modulator as a single unit to minimize analog voltage carrying lines and employ a common power supply.

Where data is to be transmitted and its collection to be controlled at a remote station, the digital translator 21 may be eliminated, and a second address control 200, remote from and substantially identical to the first, will be provided having a start line 202 and also a data line 204 connected between the remote address control and address control 20. A digital translator 206 identical to the translator 20, described in detail in connection with FIG. 6, is provided having the same connections with the address control 200 as are illustrated for connecting the translator 21 to the address control 20. In such an arrangement, the local digital translator 21 is redundant and need not be used. When used with a remote address control 200, the start signal may be applied to the remote address control 200, to an OR gate thereof that corresponds to OR gate 152 of FIG. 6 whereby the remote address control 200 will provide on line 202 a reset pulse (at the output of the pulse shaper 146 of the remote address control) which is applied to the start OR gate 152 of local address control 20. The latter will continue to go through one full multiplexer sampling cycle just as described in connection with FIG. 6 and in such a situation provides via a line 204 (FIG. 6) at the output of input amplifier 134, the various sets of data pulses to be applied (after suitable signal level control) to the input of amplifier 134 of the remote address control 200. In such an arrangement, of course, the restart signal provided by the local address control 20 at the output of one-shot multivibrator 142 would be disabled so that restart and start would occur only under control of the remote address control 200.

With such remote control, it is possible to eliminate one of the two illustrated lines connecting the local address control 20 and the remote address control 200 by employing suitable logic that senses the absence of data for some predetermined period as would occur upon the end of a complete multiplexer cycle. When such a duration of absence of data is sensed, the data transmission line 204 would be temporarily connected to the start input of the local address control 20 for reception of the start signal from the remote address control. Thus the line would be temporarily connected to feed start and restart signals from remote to local address control and between such signals would be connected for transmission of data.

It will be recalled that a fundamental advantage of the invention described herein is the provision of a repetitively fluctuating signal having a period of such repeated fluctuations that is substantially linearly related to the information to be transmitted. The circuitry described in FIG. 2 is specifically adapted to provide precise linear correlation between the period of the repeated data pulses and the output signal on the wiper arm 32 of the transducer. In some situations the transducer is nonlinear or has a transfer function that may vary with time or age of the transducer. In order to maintain the precision of linearity between the transducer input and the time period output in such cases, it is merely necessary to determine by empirical or other means the specific transfer function of the transducers. These are stored in the computer that handles and operates upon the information that is modulated and transmitted through the various systems. Alternatively, where the transfer function of the transducer is considered to be relatively stable and is known, a compensating or inverse transfer function may be built into amplifier 73 whereby the output of such amplifier is a truly linear function of the condition sensed by the transducer.

In those situations where relatively inexpensive and less accurate transducers are to be employed, the system can be arranged to maintain considerably higher accuracy, an accuracy that is not degraded by the lower quality transducer. In such an arrangement, each channel of information handling and modulation would be independently calibrated and the specific calibration for each such channel stored in the data processing computer for compensation of the individual data signals provided from the digital translator.

FURTHER MODIFICATIONS

The circuit of FIG. 2 shows an arrangement that modulates both half cycles of the square wave of the oscillator. It will be readily appreciated that principles of the present invention can be applied in a system where only one half, that is one of the two half cycles of the multivibrator, would be time modulated. In such a situation in order to maintain the concept of the present invention and provide both half periods of each data pulse with a truly symmetrical duration, the output of the modulated half cycle multivibrator is fed into a divide by two circuit such as a conventional flip-flop which sets at the beginning of one multivibrator cycle and then resets on the beginning of the next.

Although a variety of transducers may be employed, any type of transducer that produces an analog voltage output having a known relation to an input condition to be sensed can provide an input to the amplifier 73. It is also within the scope of this invention to employ in the place of one or both of the timing capacitors 52 and 54 of FIG. 2 one or a pair of capacitive transducers of the type in which the capacitance is directly modified by the input condition to be sensed. In such an arrangement, of course, the linear current charging circuits would be retained, but the voltages to which the timing capacitors are charged and discharged would remain fixed and would not be varied in accordance with any input signal.

Figure 8:
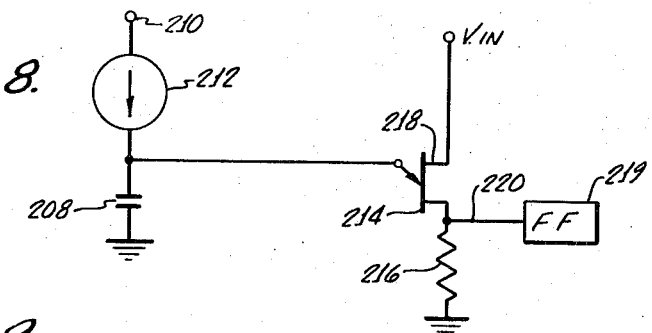
FIG. 8 shows an alternative time modulator that may be employed in the practice of this invention.

Although the time modulator circuit illustrated in FIG. 2 is preferred because of the many advantages of voltage regulation, impedance matching and linearity of output, it will be readily appreciated that other types of time modulator circuits may be employed in the practice of this invention. For example, as illustrated in FIG. 8, there may be employed a time modulator comprising a capacitor 208 charged from a voltage source 210 via a linear charging circuit 212 to a level where the charge on the capacitor reaches a value sufficient to cause conduction of a uni-junction transistor 214 through a load resistor 216. The uni-junction transistor fires at a fixed percentage of the voltage from its base 1 to its base 2 electrode. Since in this linear time modulation circuit the voltage on the base 2 electrode 218 of the uni-junction transistor is controlled by the input analog voltage indicated as $V_{IN}$, it will be seen that the capacitor 208 will linearly charge until its charge reaches a value that causes firing of the uni-junction transistor. Thus the time required for such linear charging will be directly proportional to the input voltage at a first base electrode of the uni-junction transistor. An output signal taken from the junction between the second base electrode of the transistor and the resistor 216 is fed to a flip-flop 219 which provides a square wave output having each half cycle thereof of a duration symmetrically and linearly related to the input signal voltage applied to the first base electrode.

SUMMARY

There has been described an improved apparatus and method of handling data that employs the generation of a number of periodically repetitive modulated signals of which the periods have durations that indicate respective magnitudes of different ones of a group of analog signals. The periodic signals are sampled over a number of consecutive periods and total duration of a number of sampled periods is conveniently digitized by providing a number of fixed repetition rate clock pulses gated for the total duration of the sample time. Not only do the individual data signals from any one of the group data channels have a duration directly representative of analog information but the multiplexing itself is arranged such that the sample time for any given channel is directly proportional to an integral multiple of the data pulses. In the described arrangement, there is provided a data signal having a repetitive period proportional output that is linear in the time domain and can be locally or remotely addressed to provide a stable, high precision, and high resolution data acquisition handling modulation and digitization method and apparatus.

We claim:

1. A data handling system comprising at least one input channel, said channel comprising:
  an analog signal input,
  modulating means responsive to said signal input for generating a repetitive time modulated signal having a period that has a predetermined relation to said analog signal input, and
  means for employing said time modulated signal to provide an indication of said input,
  said last mentioned means comprising means for indicating the total duration of a number of periods of said signal, said means for indicating comprising
    means for initiating a time interval upon occurrence of one of said periods,
    means for terminating said time interval upon occurrence of a predetermined number of said periods following said one period, and means for indicating the duration of said time interval.

2. The system of claim 1 including a transducer having a circuit for producing said analog signal input in accordance with a condition to be sensed by the transducer, and further including means for packaging said transducer circuit and said modulating means together as a single unit whereby the repetitive time modulated signal occurs near the transducer and the length of analog data transmission line from the transducer to the modulator is minimized.

3. The system of claim 2 including a switch interposed between the output of said modulating means and the input of said means for employing said time modulated signal, said switch being positioned within said packaging means, said packaging means including a switch controlling input terminal for receiving an external command signal whereby said time modulated signal may be transmitted to said means to provide an indication of said input in response to an externally applied command signal.

4. The system of claim 1 wherein said modulating means includes means for generating a fluctuating signal having repetitive full cycles of fluctuation, each said full cycle having a basic period, and wherein said modulating means further includes means responsive to said analog signal input for modulating said fluctuating signal to vary the period of each of said full cycles in direct proportion to said analog signal input.

5. The system of claim 4 wherein said means for generating a fluctuating signal comprises means for generating each of at least a plurality of full cycles of said fluctuating signal with half cycles of mutually equal basic duration, and wherein said means for modulating said fluctuating signal comprises means for varying the duration each of said half cycles in proportion to said input signal.

6. The system of claim 5 wherein said means for initiating a time interval upon occurrence of one of said periods and said means for terminating said time interval comprises counting means responsive to said modulating means for counting repetitions of said time modulated signal, and gating means responsive to said counting means.

7. The system of claim 6 wherein said means for indicating duration of said time interval includes oscillating means for generating a train of pulses of fixed repetition rate, means for feeding said fixed repetition rate pulses to said gating means, and means for accumulating a count of said fixed repetition rate pulses passed by said gating means.

8. The system of claim 6 including means for selectively varying the total count of said counting means to thereby vary the total number of time modulated signal repetitions counted and thereby vary the resolution of the indication.

9. A data handling system comprising at least one input channel, said channel comprising:
  an analog signal input,
  modulating means responsive to said signal input for generating a repetitive time modulated signal having a period that has a predetermined relation to said analog signal input, and
  means for employing said time modulated signal to provide an indication of said input,
  said last mentioned means comprising means for indicating the total duration of a number of the periods of said signal,
  said means for indicating comprising means for gating a train of fixed repetition rate clock pulses for a gating period equal to the duration of said number of periods of said signal.

10. The system of claim 9 including a transducer having a circuit for producing said analog signal input in accordance with a condition to be sensed by the transducer, and further including means for packaging said transducer circuit and said modulating means together as a single unit whereby the repetitive time modulated signal occurs near the transducer and the length of analog data transmission line from the transducer to the modulator is minimized.

11. The method of handling information comprising the steps of generating a fluctuating signal having repetitive full cycles of basic duration, and mutually equal basic duration positive going and negative going half cycles, time modulating said signal to change the duration of each of said half cycles by an amount directly proportional to the information to be handled, and employing such signal with its information varied half cycle durations as an indication of said information, said last-mentioned step comprising the steps of indicating the total duration of a predetermined number of cycles of said time modulated signal to provide an expanded representation of the information contained in the duration of individual half cycles.

12. The method of claim 11 wherein said step of indicating total duration includes the steps of counting a selected number of cycles of said time modulated signal, generating a gating signal having a duration proportional to the number of cycles counted, and counting the number of pulses of a fixed repetition rate pulse train that occur during said gating signal.

13. The method of claim 12 including the step of varying the resolution of the representation of information contained in the duration of individual half cycles by selectively varying the total number of cycles counted.

14. A data handling system comprising input means adapted to receive a signal input, means for generating a fluctuating signal having repetitive full cycles of fluctuation, each said full cycle having a basic period, and means responsive to said signal input for modulating said generating means to vary the period of each said full cycle in direct proportion to said input signal, a pulse shaper responsive to said means for modulating and having an output, a counter responsive to the output of said pulse shaper and including means for generating a gating signal having a duration proportional to a number counted by the counter, means for selectively varying the number to be counted by the counter thereby to selectively vary the duration of said gating signal, an oscillator having a fixed repetition rate output, a coincidence circuit having a first input from said gating signal and having a second input from said oscillator output, and having a counting output, and means for indicating the total number of units in the counting output of said coincidence means.

* * * * *